United States Patent
Ghittino et al.

(10) Patent No.: US 8,386,770 B2
(45) Date of Patent: Feb. 26, 2013

(54) AUTHENTICATION METHOD WITHOUT CREDENTIAL DUPLICATION FOR USERS BELONGING TO DIFFERENT ORGANIZATIONS

(76) Inventors: Andrea Ghittino, Turin (IT); Stefano Annese, Turin (IT); Roberto Borri, Turin (IT); Sergio Sagliocco, Cuneo (IT)

( * ) Notice: Subject to any disclaimer, the term of this patent is extended or adjusted under 35 U.S.C. 154(b) by 249 days.

(21) Appl. No.: 12/742,761

(22) PCT Filed: Nov. 24, 2008

(86) PCT No.: PCT/IB2008/003194
§ 371 (c)(1),
(2), (4) Date: Jul. 14, 2010

(87) PCT Pub. No.: WO2009/068956
PCT Pub. Date: Jun. 4, 2009

(65) Prior Publication Data
US 2010/0281524 A1    Nov. 4, 2010

(30) Foreign Application Priority Data
Nov. 26, 2007 (IT) .............................. TO2007A0853

(51) Int. Cl.
*H04L 29/06* (2006.01)
*G06F 21/00* (2006.01)
*G06F 7/04* (2006.01)
*G06F 9/00* (2006.01)

(52) U.S. Cl. ............ 713/153; 713/150; 713/182; 726/5; 726/12

(58) Field of Classification Search ................ 726/5, 12; 713/150, 153, 182
See application file for complete search history.

(56) References Cited

U.S. PATENT DOCUMENTS

| 7,191,467 | B1 | 3/2007 | Dujari et al. |
| 2003/0004834 | A1* | 1/2003 | Yamazaki ........................ 705/26 |
| 2003/0041240 | A1* | 2/2003 | Roskind et al. ............... 713/168 |
| 2006/0185021 | A1 | 8/2006 | Dujari et al. |
| 2006/0206932 | A1* | 9/2006 | Chong ............................. 726/10 |
| 2006/0239254 | A1 | 10/2006 | Short et al. |
| 2007/0240202 | A1* | 10/2007 | Sullivan et al. ................... 726/4 |

FOREIGN PATENT DOCUMENTS
EP    1770940    4/2007

OTHER PUBLICATIONS

International Preliminary Report on Patentability for PCT/IB2008/003194, dated Mar. 26, 2010.
International Search Report for PCT/IB2008/003194, dated Jul. 17, 2009.
Written Opinion of the International Searching Authority for PCT/IB2008/003194.

* cited by examiner

*Primary Examiner* — Mohammad W Reza
(74) *Attorney, Agent, or Firm* — Buchanan Nipper

(57) ABSTRACT

The present invention relates to a method for allowing a user to access the Internet. A user sends an Internet access request through a first Organization's gateway and supplies to the latter some credentials for his/her authentication with a second Organization. The credentials provided contain at least one piece of information about the second Organization. The first Organization contacts the second Organization for the purpose of authenticating the user and granting him/her access to the Internet. The second Organization then gives the user the authorization to access the Internet. According to the invention, upon the access request the gateway redirects the user to a web page of the second Organization, where the user supplies to the second Organization, through the web page, further authentication credentials required for his/her identification.

20 Claims, 2 Drawing Sheets

AUTHENTICATION METHOD WITHOUT CREDENTIAL DUPLICATION FOR USERS BELONGING TO DIFFERENT ORGANIZATIONS

The present invention relates to a method for allowing a user to access the Internet according to the preamble of claim 1.

In particular, the invention aims at increasing the possibility of accessing the Internet for a user.

The Internet has now become an indispensable work tool for many people and, thanks to wireless networks (e.g. WLAN), a user can access the Internet even from out of the office.

For instance, airports, railway stations and libraries have Hot Spots, i.e. access points where a user can connect to the Internet through a gateway.

Within a Hot Spot of a given Organization, access to this service is usually only granted to users having a valid account registered with that Organization.

A user of a given Organization cannot therefore access the Internet in areas which are not covered by said Organization due to lack of interest or infrastructure failures.

In order to overcome these problems, several solutions have been conceived which allow a user of a first Organization to access the Internet through access points of a second Organization.

In relation to the platform in use, some of these solutions sometimes require even complex configurations of the user's client.

Other solutions, which are preferable in terms of ease of use and client configuration, only operate at gateway level by redirecting those users who are not included in the list of authorized users to the Authentication Server of a different Organization.

One of the latter solutions is known from U.S. Pat. No. 5,898,780, which discloses a method and an apparatus for allowing a user to access the Internet from a remote location by using a local Internet Service Provider (ISP) with which he/she has no account. The user signs with the local ISP's system by using the credentials (username and password) of his/her account with the remote ISP.

A local ISP's server recognizes that the credentials entered by the user contain a piece of information that allows to identify the local ISP's server, and sends a query to the latter in order to authorize the user to access the Internet through the local ISP.

However, this solution suffers from the drawback that the user's sensible data (username and password) are supplied to the local ISP's server, so that said data may be subject to sniffing attacks.

A solution that uses an opposite philosophy to the one known from U.S. Pat. No. 5,898,780 has been used by the University of Trento and presented to the public under the name of Uni-fy.

According to this solution, it is supposed that the user client sends a DHCP request to the University's gateway, which then assigns an IP address to it.

The gateway has some firewall rules, each with two possible actions that depend on whether the user who is sending the data packets is included in a list of authorized users or not.

If the user is not included in the list of authorized users, then the data packet will be routed to a gatekeeper that will deal with the authorization. According to a method of the "captive portal" type, an unauthorized user is directed to a local web page, where he/she can select the Organization from which he/she wishes to obtain the authorization.

At this point, the user client is put in communication with the selected Organization, and authentication procedures are carried out according to the protocols required by that Organization.

With this solution, the network equipment of the University of Trento cannot and must not, by any means, come to know the user's sensible data, all of which is sent directly to the selected Organization.

If the authentication is successful, the selected Organization will send an authorization request to the University's gatekeeper, which will change the user's status from unauthorized to authorized, thus allowing him/her to access the Internet.

This solution has the drawback that recognizing the connected user (e.g. for security or invoicing reasons) is not easy and requires that the user's pseudonym be associated with the user's identity registered with the remote authenticating Organization.

Moreover, this solution has significant system scalability limitations, since the manual selection of the Organization by which the user wants to be authenticated assumes that the University's gateway knows all existing authenticating Organizations and that it is constantly updated with any changes in the authentication procedures of every single authenticating Organization.

As the number of authenticating organizations grows, the complexity of the University's system management increases considerably as well.

The main object of the present invention is to overcome the drawbacks of the prior art by providing an alternative method for allowing a user to access the Internet through a gateway of an Organization with which he/she is not initially accredited.

This object is achieved through a method incorporating the features set out in the appended claims, which are intended as an integral part of the present description.

The present invention is based on the idea of separating the time instants (and the recipients) in which the authentication credentials are supplied.

More specifically, the idea is that, when a user connects to the gateway of a first Organization and sends an Internet access request, said gateway supplies a part of the credentials required for accrediting the user with a second Organization. For example, the user may provide a username and an identifier of the second Organization.

If the gateway that receives such a request does not recognize the user as an authorized user, will redirect the user to a web page of the second Organization for his/her authentication.

At this point, through said web page the user supplies further credentials required for his/her identification with the second Organization, so that the latter can verify the user's identity and allows him/her to navigate the Internet.

This solution offers several advantages.

First of all, the user can be identified by the first Organization through the credentials provided in the Internet access request, thus simplifying the identification of the user for public security or invoicing reasons; nevertheless, the first Organization is not given all the user's credentials, which makes this solution rather robust against sniffing attacks.

Secondly, this solution is easily scalable, since new Organizations can be added to the federation by simply adding a computer system (in particular, a network node and a server) capable of performing the functions of the method according to the invention.

Advantageously, the credentials supplied by the user to the first Organization are entered through a welcome web page and include a username in the name@realm format, wherein realm represents the second Organization's domain name.

Based on the specified realm, each gateway can find the authentication server of the Organization to which the user belongs, whether through a request sent to the DNS or through a comparison with a list stored at gateway level and containing all the authentication servers of the Organizations belonging to the federation.

In order to ensure that the communications between the gateways and the authentication servers of different Organizations are authenticated, the signalling messages are advantageously signed and preferably encoded by using an asymmetrical cryptography algorithm such as the one used by PGP® (Pretty Good Privacy), which uses both public and private keys.

Aiming at simplifying the management of key exchanges when new Organizations are added (or removed), the architecture advantageously includes a key management server.

Every time a new Organization is added, the public key of the associated authentication server is published on this server; the gateways of the various Organizations will contact it periodically through a secure communication protocol (e.g. HTTPS) in order to update the respective key list.

Storing a key list at gateway level ensures that any failure of the key management server cannot jeopardize the service; in the worst case, a new authentication server will be added to the system with a delay of a few hours.

The key management server is authenticated by all of the gateways of the various Organizations through its own public key, which is present on all said gateways, and allows no external user to enter his/her own Organization without permission.

Further objects and advantages of the present invention will become more apparent from the following description and from the annexed drawings, which are supplied by way of non-limiting example, wherein.

Figure 1:
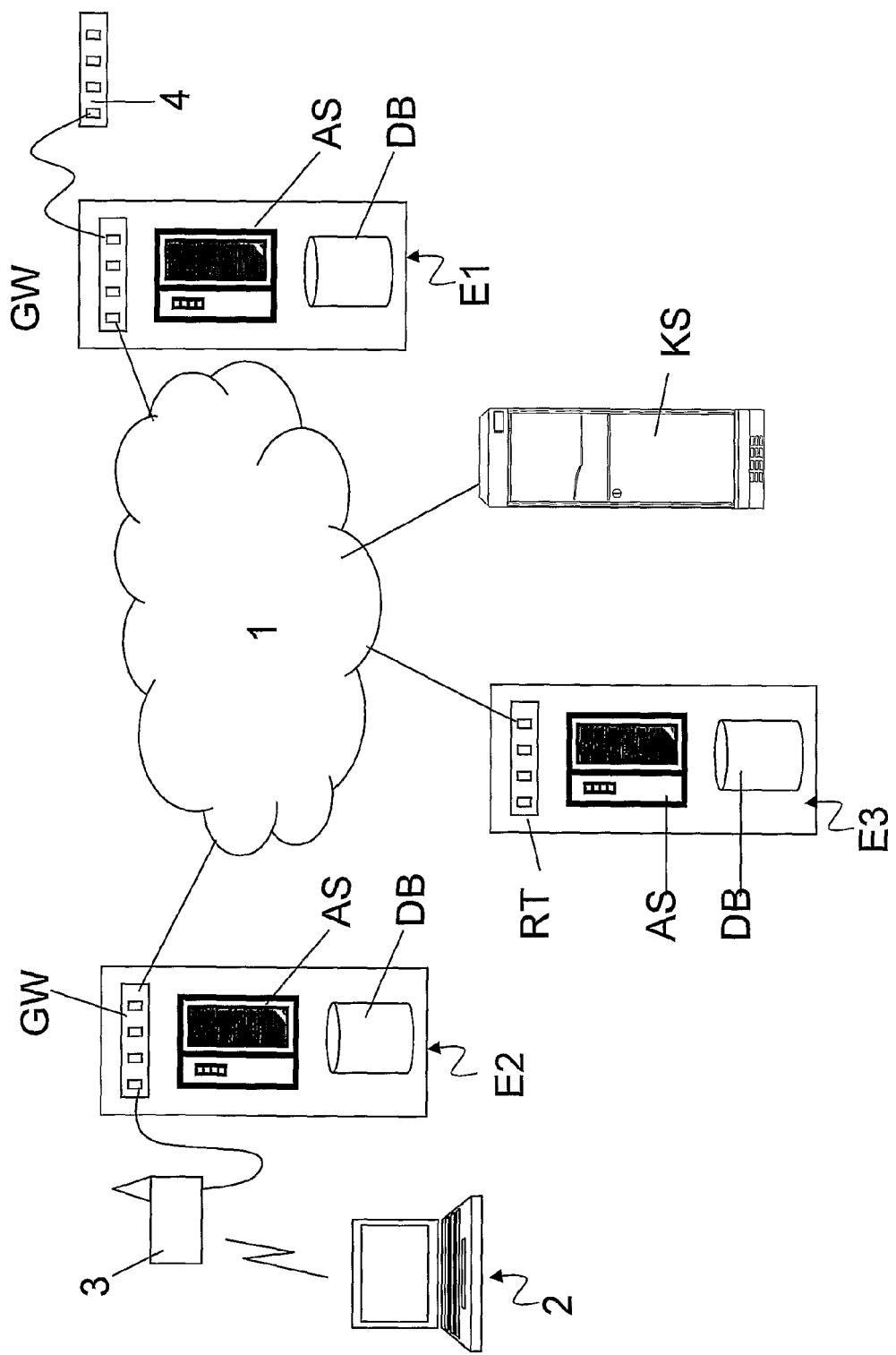
FIG. 1 shows a federation of Organizations which allow users belonging to any of said Organizations to access the Internet.

Referring now to FIG. 1, there is shown a federation of Organizations (E1, E2, E3) connected to the Internet 1.

For the purposes of the present description, the term "Organization" refers to any entity which can grant a user access to the Internet, or which handles a structured user management system.

In the example of FIG. 1, Organizations E1 and E2 are equipped with a computer system, in particular a network node, which comprises a gateway GW, an authentication server AS, and a database DB containing information required for authenticating the Organization's users.

Gateway GW carries out all firewall functions and filters any unauthorized traffic, whereas authentication server AS verifies the user's credentials in a database DB (MySQL or LDAP database, or password file) or through a standard protocol such as, for example, RADIUS.

In the example of FIG. 1, Organization E2 is equipped with an access point 3 through which it provides users with wireless access.

Organization E1 is equipped with a switch 4, connected to the gateway GW, for providing users with wired access.

Organization E3 is an Internet Service Provider ISP without its own access network, but having its own users.

This Organization is equipped with an authentication server AS and a database DB, just like Organizations E1 and E2; the authentication server AS is connected to the Internet through a router RT which, unlike the gateway GW of Organizations E1 and E2, cannot carry out the user redirect functions described below.

Of course, router RT may be replaced with a gateway GW, although in such a case some functions thereof will remain unused.

Figure 2:
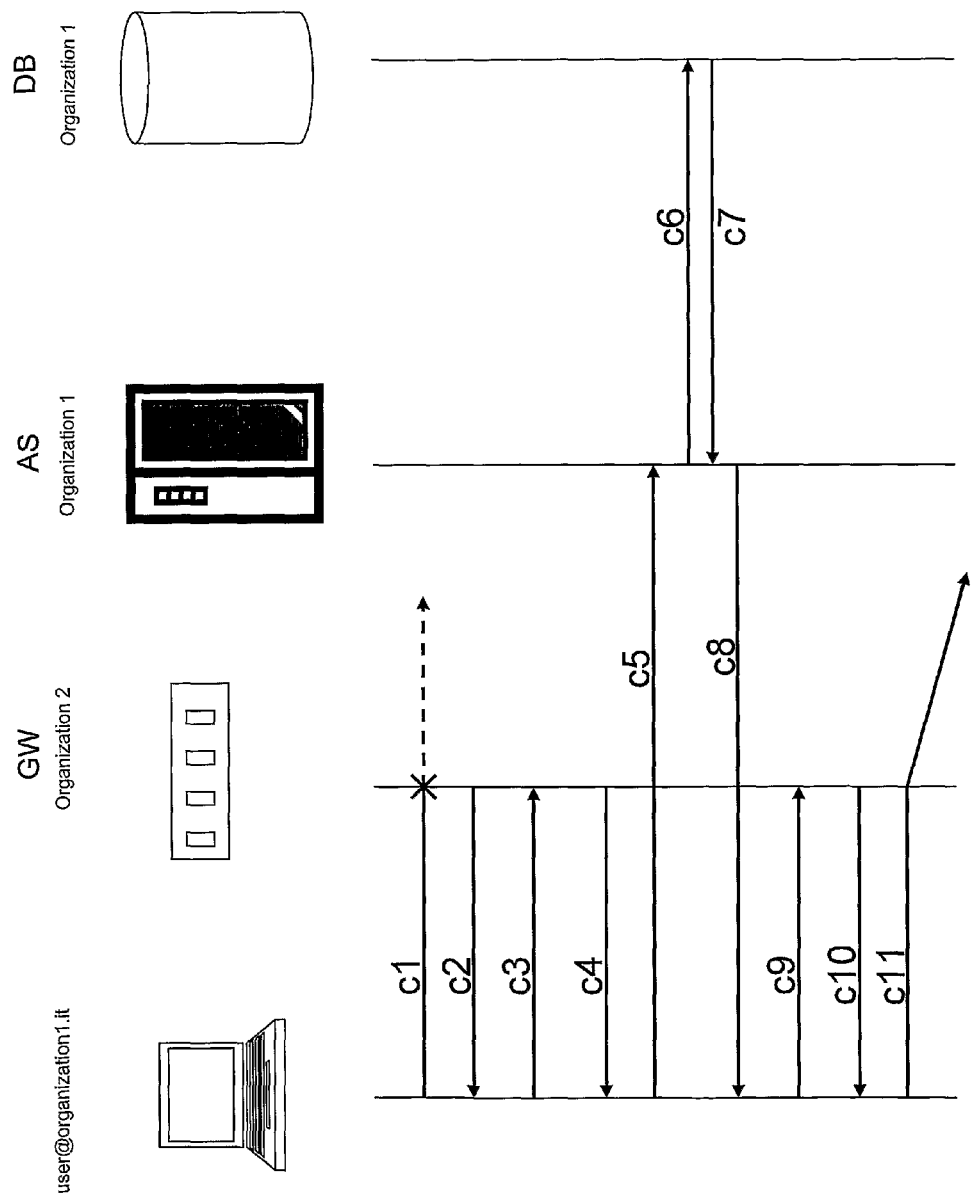
FIG. 2 is a diagrammatical representation of the procedure that allows a user belonging to a first Organization to access the Internet through an access point of a second Organization.

Still referring to the example of FIGS. 1 and 2, user 2 is an authorized user (i.e. belonging to the domain) of Organization E1, and sends a web request to Organization E2 with which he/she is not authenticated.

This situation may for example arise when a user of Organization E1 (e.g. an employee of company ALFA) is at the airport or in the vicinity of another Organization (e.g. company BETA) and wishes to access the Internet by using the infrastructures of the airport or those of company BETA.

As user 2 verifies the presence of a Hot Spot of Organization E2, he/she sends a DHCP request upon which he/she is assigned an IP address.

At this point, user 2 can send an Internet access request.

Gateway GW intercepts this request and redirects the client to a welcome page on which the user enters a part of his/her credentials required for his/her authentication with Organization E1.

According to the invention, the credentials supplied to Organization E2 contain at least one piece of information about the Organization with which the user wants to be authenticated, i.e. Organization E1 in the example described herein.

Preferably, these credentials consist of the username of user 2 and domain name of Organization E1, which will have to authenticate user 2.

The username and domain name may be entered in separate fields, or else they can be obtained automatically by the gateway if user 2 is asked to enter an account in the name@realm format, where 'name' is the username of user 2 and realm represents the domain name of Organization E1.

By using the credentials supplied by the user, Organization E2 can thus contact Organization E1 in order to have user 2 authenticated.

The IP address of the authentication server of Organization E1 is determined by means of the following hierarchy of rules.

First of all, gateway GW of Organization E2 places a predefined name before the realm (e.g.: authserv) and sends a request to the DNS in order to know the IP address of the authentication server AS of origin of the user (i.e. the one of Organization 1).

For example, for user mario.rossi@organization1.it, gateway GW will search the

DNS for the IP address of authserv.organization1.it.

The name placed before the realm is the same for all authentication servers of the organizations belonging to the same federation, so that the query to be sent to the DNS by the gateway can be formulated in a simple manner.

When a positive reply is received from the DNS, the gateway GW will redirect user 2 to the authentication server of Organization E2; if the search is unsuccessful, the process will go on to the next rule.

According to this next rule, the IP address of the authentication server AS of Organization E1 is searched for in a local database of Organization E2.

According to the invention, all gateways GW of the various Organizations store a list of domains and IP addresses of corresponding authentication servers in a local database.

Said list is updated periodically by a predefined central server, which is preferably common to all federate Organizations.

Should also the search in said database be unsuccessful, the gateway that received the web request will switch to the last rule, according to which the user will be redirected to a default authentication server previously set up when the gateway was installed.

This last rule essentially allows to recognize as information concerning a predefined Organization the absence of any information explicitly specified by the user in the Internet access request.

In other words, if user 2 only supplies his/her name to gateway GW, without specifying the domain of Organization 1 with which he/she wants to be authenticated, then the gateway will interpret this information as a desire to be authenticated with a default Organization.

Once the authentication server has been found, the gateway will redirect the client to the authentication server, and the user will be authenticated by entering his/her own password, thus returning to a standard authentication procedure, such as the one provided by 'Captive Portal' systems like the NoCat system.

If the username and password verification is successful, the authentication server will send an authorization message to the client of user 2, which message will then be redirected to gateway GW.

The latter will enter the necessary firewall rules, so as to provide the services included in the user's profile, and will then redirect the user to the web page that was requested initially.

The above-described procedure is exemplified in FIG. 2, which shows the communications among the client of user 2, the gateway of Organization E2, the authentication server of Organization E1, and the database of Organization E1, which stores the identities of all users authorized by Organization E1.

With reference to FIG. 2:

the client sends a web request, e.g. http://www.google.it (sequence c1), the gateway intercepts the request and redirects the client to an authentication portal (sequence c2), the client sends its credentials, e.g. username (sequence c3), the gateway redirects the client to the portal of the authentication server (sequence c4), the user enters a password (sequence c5), the authentication server verifies the user's credentials (username and password) by comparing them with those contained in a database, e.g. through the RADIUS protocol (sequence c6), the user is authorized (sequence c7), the authentication server sends a firewall opening message to the client as an authentication confirmation (sequence c8), the client forwards the received message to the gateway in order to open the firewall (sequence c9), the gateway redirects the client to the requested site http://www.google.it (sequence c10), The client accesses the Internet on the requested site http://www.google.it (sequence c11).

This type of architecture provides absolute system scalability.

As a matter of fact, the system can be expanded easily by installing a gateway GW at a new Organization EX and by registering the authentication server that will manage the users belonging to the new domain (e.g. organizationX.it) in the DNS; due to the aforementioned reasons, the registration in the DNS must be made in the previously described format, e.g. authserv.organizationX.it.

Advantageously, in order to prevent any other system from substituting for an authentication server and trying to authenticate unregistered users, the communication between the authentication server and the gateway is signed; in particular, the communication is signed and preferably encoded by using an asymmetrical cryptography method of the public key/private key type.

Preferably, when messages are only signed, the message is left in clear, but a hash calculated with the private key is attached to it which, once verified with the public key, ensures that the message is the original one created by the owner of the private key.

The messages thus exchanged are then signed and preferably encoded through a key (private for the signature, public for the encoding) obtained, for example, through the PGP software.

Each gateway GW contains a list of the public keys of the authentication servers AS of the federated Organizations, so that it can verify that there is no false authentication server trying to sniff the authentications.

In order to keep the system updated without scalability limitations, a key management server (KS in FIG. 1) is used which contains a repository (e.g. PGP) of the public keys belonging to the authentication servers recognized by the system.

Adding a new Organization therefore involves entering in this list the key of the authentication server AS that manages the new domain.

Each gateway contains a copy of the key list; in order to keep the system updated, according to the method of the invention the gateways periodically consult the key management server KS and download the key list.

When a new authentication server is added to the system, there will be a first transitory period in which the new Organization's users cannot use their credentials in roaming mode with the other domains of the system; said period will last until the local key copies will have been updated in all gateways.

This out-of-service condition is therefore only related and limited to the installation of new Organizations, not to network maintenance.

Since each gateway contains a copy of the list of the public keys of the authentication servers of all Organizations, the system will continue working even in the event of a malfunction or failure of the key management server KS.

The system so conceived allows to manage the invoicing of the traffic of the different Organizations' users, because every gateway through which Internet access takes place contains and must maintain information about each user's connection times in special logs; such information includes both the user's name and the respective Organization, thus allowing the traffic to be invoiced correctly.

The above-described mechanism assumes that trust policies exist among the various Organizations; should a control mechanism be needed, it will be preferable to employ a central server that receives information about the users' connections from all the other servers, so that the connections stored in each gateway can be verified.

It is clear that the above-described embodiment is to be understood as a non-limiting example of the invention, and that many changes may be made to the system without departing from the protection scope of the invention as stated in the appended claims.

For example, the gateway, the authentication server and the authentication database (e.g. SQL database) may be either implemented by one machine or distributed over a number of machines.

Furthermore, the methods used for encoding the communications between the authentication servers and the gateways or between the authentication servers and the clients may be of any type known in the art.

The invention claimed is:

1. Method for allowing a user to access the Internet through a gateway of a first Organization with which the user is not authenticated, wherein said user sends an Internet access request through said gateway of said first Organization, said Internet access request requiring that said user supplies to said first Organization first authentication credentials required for his/her authentication with a second Organization with which the user wants to be authenticated, said first authentication credentials containing at least one piece of information about said second Organization, and wherein said first Organization contacts said second Organization for the purpose of authenticating said user and allowing him/her to access the Internet, and wherein said second Organization gives said user the authorization to access the Internet, wherein, upon said Internet access request, said gateway redirects said user to a web page of said second Organization, and that said user supplies to said second Organization, through said web page, second authentication credentials which are necessary for identifying said user with said second Organization.

2. Method according to claim 1, wherein said first authentication credentials comprise a username expressed in the name@realm format, where 'name' identifies the user and 'realm' identifies said second Organization.

3. Method according to claim 1, wherein said second credentials comprise a password.

4. Method according to claim 1, wherein said Internet access request comprises a first step wherein an IP address is assigned to said user and a second step wherein said gateway redirects said user to a local welcome web page on which said user must enter said first credentials.

5. Method according to claim 1, wherein, if said gateway cannot find an authentication server of said second Organization, then said gateway will send said first credentials to a default authentication server.

6. Method according to claim 1, wherein said gateway sends said first credentials to an authentication server of said second Organization.

7. Method according to claim 6, wherein said gateway determines the address of said authentication server through a query sent to a DNS.

8. Method according to claim 6, wherein said gateway has access to a list of Organizations and determines the address of said authentication server by comparing said list with said first credentials.

9. Method according to claim 5, wherein the communication between said gateway and said authentication server is signed.

10. Method according to claim 5, wherein the communication between said gateway and said authentication server is encoded.

11. Method according to claim 10, wherein the communication between said gateway and said authentication server is encoded through public key/private key encoding.

12. Method according to claim 11, wherein a key management server maintains a list of public keys of a plurality of authentication servers of a corresponding plurality of Organizations.

13. Method according to claim 12, wherein the gateways of said plurality of Organizations connect periodically to said key management server and store said public key list locally.

14. A computer system utilizing the method according to claim 1.

15. A computer program stored in memory areas of a computer and containing code portions utilizing the method according to claim 1 when executed by said computer.

16. Method according to claim 1, wherein said first authentication credentials comprise a username expressed in the name@realm format, where 'name' identifies the user and 'realm' identifies said second Organization, and wherein said second credentials comprise a password.

17. Method according to claim 1, wherein said gateway sends said first credentials to an authentication server of said second Organization, wherein said gateway determines the address of said authentication server through a query sent to a DNS, and wherein said gateway has access to a list of Organizations and determines the address of said authentication server by comparing said list with said first credentials.

18. Method according to claim 17, wherein the communication between said gateway and said authentication server is signed, and wherein the communication between said gateway and said authentication server is encoded.

19. Method for allowing a user to access the Internet through a gateway of a first Organization with which the user is not authenticated, wherein said user sends an Internet access request through said gateway of said first Organization, said Internet access request requiring that said user supplies to said first Organization first authentication credentials required for his/her authentication with a second Organization with which the user wants to be authenticated, said first authentication credentials containing at least one piece of information about said second Organization, wherein said first authentication credentials comprise a username expressed in the name@realm format, where 'name' identifies the user and 'realm' identifies said second Organization, and wherein said first Organization contacts said second Organization for the purpose of authenticating said user and allowing him/her to access the Internet, and wherein said second Organization gives said user the authorization to access the Internet, wherein, upon said Internet access request, said gateway redirects said user to a web page of said second Organization, and that said user supplies to said second Organization, through said web page, second authentication credentials which are necessary for identifying said user with said second Organization, wherein said second authentication credentials comprise a password, wherein said Internet access request comprises a first step wherein an IP address is assigned to said user and a second step wherein said gateway redirects said user to a local welcome web page on which said user must enter said first authentication credentials.

20. Method for allowing a user to access the Internet through a gateway of a first Organization with which the user is not authenticated, wherein a user sends an Internet access request through a gateway of a first Organization, said request requiring that said user supplies to said first Organization first authentication credentials required for his/her authentication with a second Organization with which the user wants to be authenticated, said first authentication credentials containing at least one piece of information about said second Organization, wherein said first authentication credentials comprise a username expressed in the name@realm format, where 'name' identifies the user and 'realm' identifies said second Organization, and wherein said first Organization contacts said second Organization for the purpose of authenticating said user and allowing him/her to access the Internet, and wherein said second Organization gives said user the authorization to access the Internet, wherein, upon said Internet access request, said gateway redirects said user to a web page of said second Organization, and that said user supplies to said second Organization, through said web page, second authentication credentials which are necessary for identifying said user with said second Organization, wherein said second authentication credentials comprise a password, wherein, if said gateway cannot find an authentication server of said second Organization, then said gateway will send said first authentication credentials to a default authentication server.

\* \* \* \* \*

UNITED STATES PATENT AND TRADEMARK OFFICE
CERTIFICATE OF CORRECTION

PATENT NO.       : 8,386,770 B2
APPLICATION NO.  : 12/742761
DATED            : February 26, 2013
INVENTOR(S)      : Ghittino et al.

It is certified that error appears in the above-identified patent and that said Letters Patent is hereby corrected as shown below:

Insert on Title Page, Item (73) to read:

--(73) Assignees: CSP - INNOVAZIONE NELLE ICT SCARL, TORINO (IT); S.I.SV.EL. S.P.A. SOCIETA' ITALIANA PER LO SVILUPPO, NONE (IT)--

Signed and Sealed this
Twenty-third Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,386,770 B2
APPLICATION NO. : 12/742761
DATED : February 26, 2013
INVENTOR(S) : Ghittino et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 299 days.

Signed and Sealed this
First Day of September, 2015

Michelle K. Lee
*Director of the United States Patent and Trademark Office*